United States Patent [19]

Payne

[11] 4,280,680
[45] Jul. 28, 1981

[54] FLUID VALVES

[75] Inventor: Barrett M. M. Payne, Sandton, South Africa

[73] Assignee: Carel W. P. Niemand, Johannesburg, South Africa; a part interest

[21] Appl. No.: 930,059

[22] Filed: Aug. 1, 1978

[30] Foreign Application Priority Data

Aug. 16, 1977 [ZA] South Africa ...................... 77/4944
Aug. 26, 1977 [ZA] South Africa ...................... 77/5185
Sep. 16, 1977 [ZA] South Africa ...................... 77/5571

[51] Int. Cl.³ .......................... F16K 7/16; F16K 41/10
[52] U.S. Cl. .................................... 251/175; 251/120; 251/210; 251/331; 251/335 A
[58] Field of Search ........... 251/175, 210, 120, 335 A, 251/331

[56] References Cited

U.S. PATENT DOCUMENTS

| 2,264,656 | 12/1941 | Briscoe et al. ..................... 251/335 A |
| 2,525,796 | 10/1950 | Harding ............................... 251/210 |
| 2,911,185 | 11/1959 | Langdon ............................. 251/175 |
| 3,219,311 | 11/1965 | Siver .................................. 251/210 X |
| 3,386,700 | 6/1968 | Greene et al. ....................... 251/175 |
| 3,399,695 | 9/1968 | Stehlin ............................... 251/331 X |
| 3,426,798 | 2/1969 | Chernak ............................ 251/331 X |

FOREIGN PATENT DOCUMENTS

| 815879 | 11/1951 | Fed. Rep. of Germany . |
| 2231382 | 1/1974 | Fed. Rep. of Germany . |
| 2234878 | 1/1974 | Fed. Rep. of Germany . |
| 76/5595 | 7/1977 | South Africa . |
| 374651 | 6/1932 | United Kingdom . |
| 672427 | 5/1952 | United Kingdom . |
| 814022 | 5/1959 | United Kingdom . |
| 944824 | 12/1963 | United Kingdom . |
| 955411 | 4/1964 | United Kingdom . |
| 1039052 | 8/1966 | United Kingdom . |
| 1042745 | 9/1966 | United Kingdom . |

*Primary Examiner*—Arnold Rosenthal
*Attorney, Agent, or Firm*—Steele, Gould & Fried

[57] ABSTRACT

A valve including a fluid port; a valve seat round the port; and closure means movable towards and away from the seat, the closure means including a sealing surface engageable with the seat and a protrusion which extends from the sealing surface towards the seat, the protrusion being operative to create an accelerated flow of fluid between the seat and the sealing surface prior to the latter engaging the seat upon movement of the closure means towards the seat and the protrusion further being adapted for at least part thereof to be urged into sealing engagement with the surround of the port by pressure in the valve when the sealing surface engages the seat.

24 Claims, 5 Drawing Figures

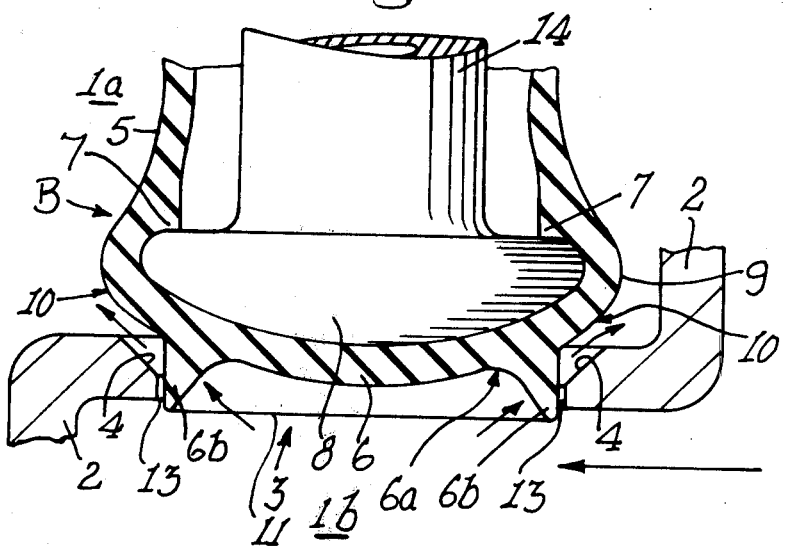
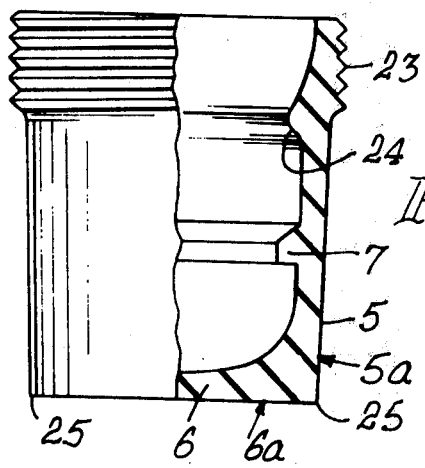

FLUID VALVES

This invention relates to fluid valves.

According to the invention a valve includes a fluid port; a valve seat round the port; and closure means movable towards and away from the seat, the closure means including a sealing surface engageable with the seat and a protrusion which extends from the sealing surface towards the seat, the protrusion being operative to create an accelerated flow of fluid between the seat and the sealing surface prior to the latter engaging the seat upon movement of the closure means towards the seat and the protrusion further being adapted for at least part thereof to be urged into sealing engagement with the surround of the port by pressure in the valve when the sealing surface engages the seat.

The protrusion may be adapted to obstruct the port and define a restricted annular passage extending round the periphery of the port before the sealing surface engages the seat.

The protrusion may be adapted to enter the port with a clearance prior to the sealing surface engaging the seat.

When the closure means as defined in the previous paragraph is moved towards the seat to shut off a flow of fluid under pressure through the port, the motion of the fluid which does continue to flow is accelerated as the flow path becomes restricted, and an accelerated jet of fluid blows with an increasing flow velocity through the clearance between the protrusion and the periphery of the port as the protrusion enters the port. The accelerated jet of fluid acts to blow away dirt and foreign matter from the mating faces of the seat and the sealing surface of the closure means before the sealing surface engages the seat, thereby to improve the seal that can be obtained.

The protrusion may have a normal outer diameter which is fractionally less than the diameter of the periphery of the port so that a suitable clearance exists between the outer periphery of the protrusion and the periphery of the port when the protrusion enters the port under conditions of zero pressure in the valve.

Alternatively, the normal outer diameter of a protrusion of resilient material may be substantially equal to, or fractionally larger than the diameter of the periphery of the port so that the protrusion enters the port with a close fit under conditions of zero pressure in the valve but so that pressure in the valve may create a clearance for the passage of a jet of fluid between the protrusion and the periphery of the port to the zone of the seat, prior to engagement of the sealing surface with the seat.

The protrusion may be operative to restrict the passage of solid material through the port to the zone between the seat and the sealing surface, the clearance being such that solid particles or other solid material of a size likely to cause damage to the seat and/or the sealing surface and/or to impair sealing engagement between the sealing surface and the seat, are unable to pass through the clearance to the zone between the seat and the sealing surface.

The protrusion may also be operative to displace solid material away from the zone of the seat when the protrusion enters the port.

The protrusion may include a recessed outer end defining a peripheral sealing formation adapted to be urged into sealing engagement with the surround of the port by pressure in the valve when the sealing surface engages the seat.

The protrusion may be arranged in any other suitable manner relative to the port and/or its surrounds so that at least part of the protrusion may be urged into sealing engagement with the surround of the port by pressure in the valve when the sealing surface engages the seat.

Thus, a resilient protrusion may normally have a substantially plane outer face or even a slightly convex outer face which is adapted to be deformed into an inwardly recessed configuration defining a peripheral rim, by pressure in the valve when the sealing surface engages the seat, the peripheral rim being displaceable into sealing engagement with the surround of the port by the pressure in the valve when the seat is engaged by the sealing surface.

It is also possible for pressure in the valve when the seat is engaged by the sealing surface, to compress a resilient protrusion axially and cause radial expansion thereof into sealing engagement with the surround of the port.

The protrusion may comprise a tip on an end of the closure means and the sealing surface may flare radially outwardly from the tip.

At least the outer surface zone of the part or parts of the closure means constituting the sealing surface and the protrusion, may comprise a resilient material. The resilient material may comprise natural or synthetic material.

The closure means may further include a resilient diaphragm adapted to isolate operating means for the closure means from fluid flowing through the valve.

The diaphragm may be adapted to be anchored in an outer peripheral zone thereof to a casing for the valve. Preferably the diaphragm is provided at its outer peripheral zone with a screw thread engageable with a screw thread on at least one of two parts between which the outer peripheral zone of the diaphragm is adapted to be trapped.

In one embodiment of the invention, the diaphragm is integrally formed with the part or parts of the closure means defining the sealing surface and the protrusion.

The closure means may comprise a cup-shaped housing of resilient material; and a deformation member having a larger outer diameter than the diameter of the inner periphery of the housing in the zone of the base thereof when the housing is in a normal underformed condition, the deformation member being locatable in the housing adjacent to the base thereof to distend the wall of the housing to produce a bulge which defines the sealing surface and also to produce a tip of smaller diameter than the bulge which protrudes from the bulge.

The base of the cup-shaped housing may have a substantially plane outer end face when the housing is in a normal underformed condition before the deformation member is located in the housing, distention of the wall of the housing by the deformation member producing a tip with a recessed outer end face defining a peripheral formation adapted to be urged into sealing engagement with the surround of the port by pressure in the valve when the sealing surface engages the seat.

The outer periphery of the wall of the housing may define a relatively sharp corner with the plane outer end face of the housing when the latter is in a normal undeformed condition.

The housing may be adapted to trap the deformation member in the housing adjacent to the base thereof.

Thus, the housing may include an inwardly directed rib or other retaining formation extending round the inner periphery of the housing in a position spaced from the base.

The deformation member may be adapted to be moved towards and away from the seat, thereby to move the sealing surface and the tip of the closure means towards and away from the seat.

The deformation member may be adapted to be connected to an operating spindle or other operating means for the closure means. The operating means may comprise a spindle of the non-rising type, the deformation member or a part fast therewith including a screw threaded socket adapted to engage a screw threaded end of the spindle.

The cup shaped housing may be adapted to act as a diaphragm to enclose the operating spindle and isolate it from fluid flowing through the valve. The cup-shaped housing may constitute an effective seal round the spindle so that a sealing gland, a packing or the like embracing the spindle is not required.

The open end of the cup-shaped housing may be anchored to a casing for the valve in any suitable manner. Thus, the open end of the housing may be adapted to be trapped between portion of the casing and a part, such as a part in which an operating spindle is rotatably mountable, which is removably mountable in or on the casing.

Thus, the open end of the housing may be trapped between an externally or internally threaded plug or cap in which the spindle is rotatably mountable; and an internally or externally threaded socket or spigot formation on the casing with which the plug or cap is detachably engageable.

The open end of the housing may include at its outer end a screw thread adapted to engage with a screw thread on at least one of the parts between which it is trapped. The housing may be made of natural or synthetic resilient material.

In an alternative embodiment of the invention, the diaphragm is fast with a separate body of resilient material which is adapted to be moved towards and away from the valve seat and which defines the sealing surface and the protrusion.

The diaphragm may be adapted to be anchored in an outer peripheral zone thereof to a casing for the valve and to be fast in a central zone thereof with the resilient body.

The protrusion defined by the resilient body may have a recessed outer end defining a peripheral sealing formation adapted to be urged into sealing engagement with the surround of the valve port by pressure in the valve when the sealing surface engages the seat.

The protrusion may include an annular recess in its outer end in a position spaced radially inwardly from its outer periphery to define a peripheral lip adapted to be urged into sealing engagement with the surround of the port by pressure in the valve when the sealing surface engages the seat.

The diaphragm and the separate resilient body may be made of any suitable natural or synthetic material.

The closure means may further include backing means against which the diaphragm may bear when subjected to pressure in the valve, thereby to prevent or at least minimise rupture of the diaphragm under pressure.

With closure means comprising a cup-shaped housing and a deformation member in the housing, the deformation member may be mushroom-shaped with an enlarged head adapted to distend the housing and a stem of reduced diameter extending from the head towards the open end of the housing, the stem constituting a rigid backing formation located longitudinally within the cup-shaped housing and a rigid transverse backing formation being fast with the stem in a position spaced from the head.

The transverse backing formation may comprise a collar or flange on the stem.

The stem of the deformation member may include a screw threaded socket adapted to engage a screw threaded end of an operating spindle or the like for the closure means.

With closure means comprising a diaphragm and a separate resilient body defining the sealing surface and the protrusion, a rigid backing formation may be located longitudinally within a cup-shaped diaphragm and a rigid transverse backing formation may be fast with the longitudinal backing formation in a position spaced from the resilient body.

The longitudinal backing formation may also be fast with the resilient body and may be adapted to be connected directly or indirectly to operating means, such as an operating spindle or the like, for the closure means. A cup-shaped rigid member may be located within the cup-shaped resilient diaphragm with the base of the diaphragm trapped between the base of the rigid member and the resilient body, the wall of the cup-shaped rigid member constituting the longitudinal backing formation for the diaphragm and the transverse backing formation being fast with the cup-shaped rigid member in a position spaced from its base.

The transverse backing formation may comprise a flange on a mounting member attached to the cup-shaped rigid member towards the open end thereof, the mounting member being adapted to engage operating means for the closure means. The mounting member may include a screw threaded socket adapted to engage a screw threaded end of an operating spindle for the closure means.

A valve according to the invention may comprise a screw down stop valve.

For a clear understanding of the invention, preferred embodiments will now be described by way of example with reference to the accompanying drawings in which:

FIG. 2 is a fragmentary sectional view to an enlarged scale of the valve seat and closure means of the valve of FIG. 1;

FIG. 3 is a side view, partly in section, of a cup-shaped housing for the valve closure means of FIG. 1, in a normal undeformed condition;

Figure 4:
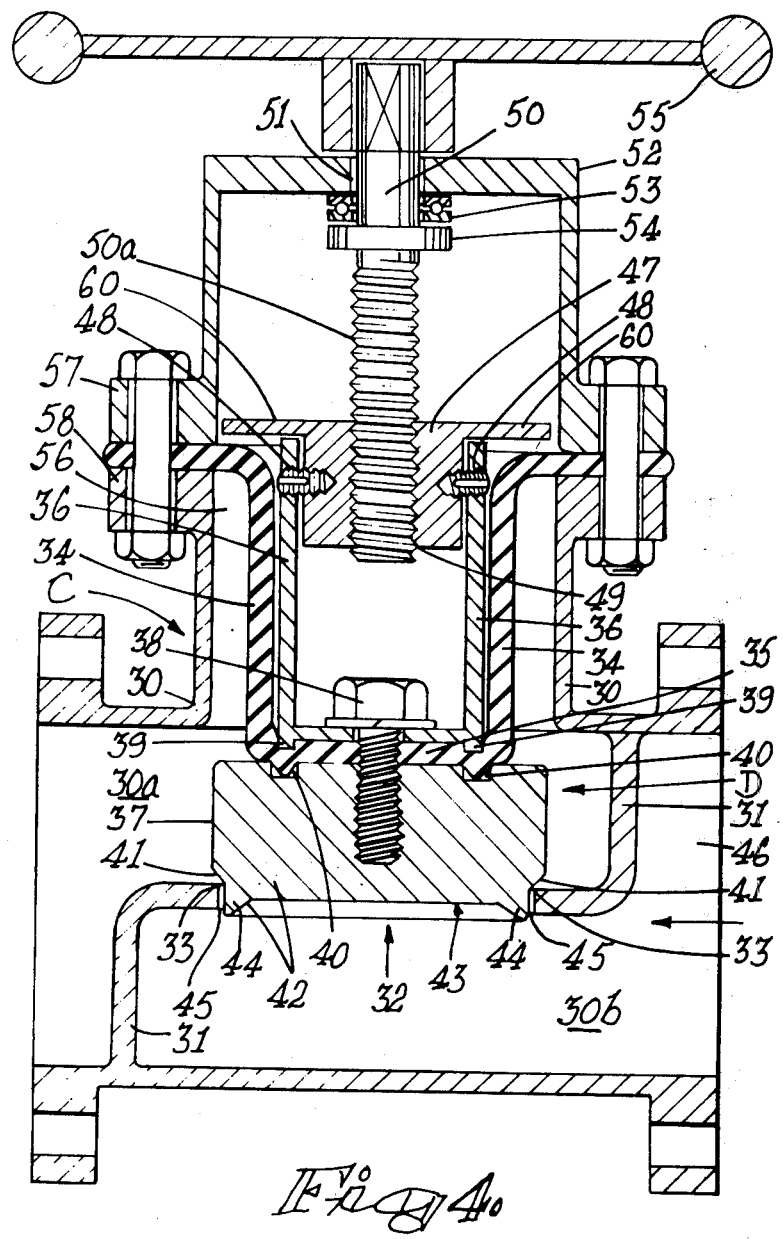
Figure 5:
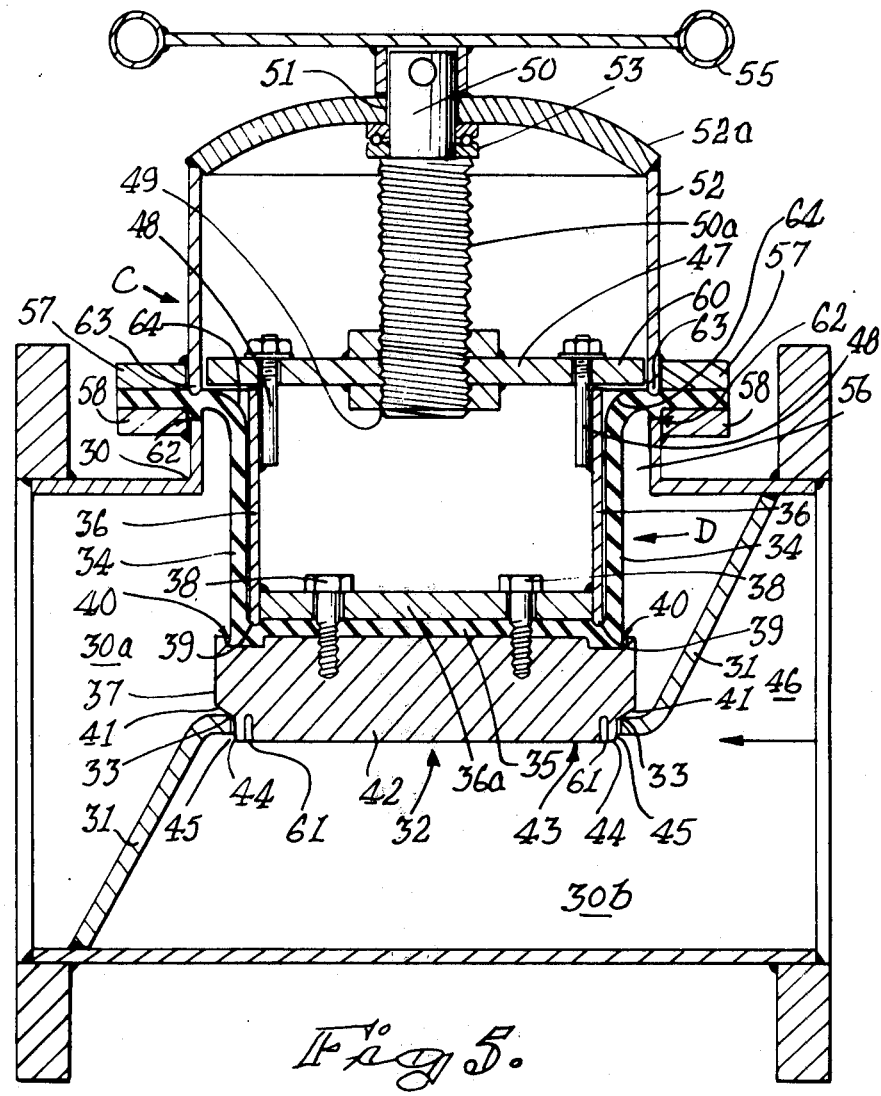

FIG. 4 is a sectional view of another embodiment of a screw down fluid valve according to the invention, with another form of closure means in which a resilient diaphragm is fast with a separate resilient body defining the sealing surface and the protrusion of the closure means; and FIG. 5 is a sectional view of a further embodiment of a screw down fluid valve according to the invention, with a different form of closure means in which a resilient diaphragm is fast with a separate resilient body defining the sealing surface and the protrusion of the closure means.

Figure 1:
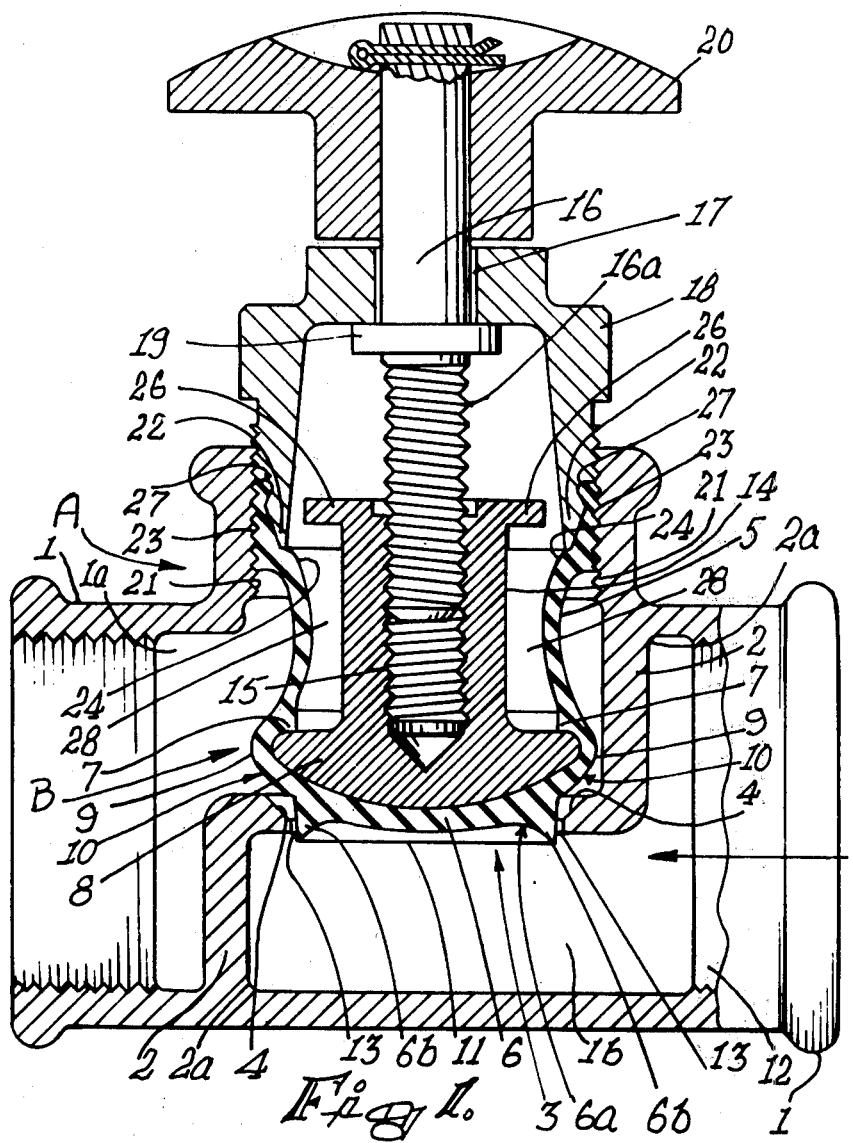
FIG. 1 is a sectional view of one embodiment of a screw down fluid valve according to the invention, with one form of closure means in which a resilient diaphragm is integrally formed with the sealing surface and protrusion of the closure means.

Referring first to FIGS. 1 to 3 of the drawings, valve A comprises casing 1 in the form of a T-piece, partition 2 dividing the interior of casing 1 into upper and lower compartments 1a, 1b respectively and defining a port 3 which places the upper and lower compartments 1a, 1b in communication with each other. Partition 2 is chamfered around port 3 to define annular valve seat 4. Closure means B which will be described in greater detail below is movable towards and away from seat 4 to shut off and open port 3.

Closure means B comprises cup-shaped resilient housing 5 including base 6 closing off one end of the housing and an inwardly directed retaining rib 7 extending round the inner periphery of housing 5 in a position spaced from base 6. In the normal undeformed condition of housing 5 shown in FIG. 3, base 6 of housing 5 has a plane outer end face 6a defining sharp corners 25 with the outer peripheral surface 5a of the wall of housing 5. Mushroom-shaped deformation member 8 having an outer diameter which is greater than the diameter of the inner periphery of housing 5 in the zone between base 6 and retaining rib 7 when housing 5 is in its normal undeformed condition, is locatable within housing 5 in the zone between base 6 and retaining rib 7.

It can be seen from FIGS. 1 and 2 that deformation member 8 distends housing 5 from its normal undeformed shape as shown in FIG. 3, to the operative shape shown in FIG. 1 in which there is produced a bulge 9 defining an annular sealing surface 10 round its outer periphery; and an outer tip 11 on housing 5 which protrudes from bulge 9 towards port 3 and has a recessed outer end face 6a. Bulge 9 flares radially outwardly from protruding tip 11. The protruding tip 11 has a normal outer diameter which is fractionally less than the diameter of port 3 so that protruding tip 11 is adapted to enter port 3 with a slight clearance under zero pressure conditions, prior to sealing surface 10 engaging seat 4 when closure means B is moved towards seat 4 to shut off port 3.

In use when valve A is connected in a fluid line with socket 12 located on the high pressure side and closure means B is moved towards seat 4, protruding tip 11 is operative to displace solid particles away from seat 4 when tip 11 enters port 3. Tip 11 also obstructs the central part of port 3 and defines a restricted annular passage 13 which extends round the periphery of port 3. Although the volume of fluid flowing is reduced, that which continues to flow forms an accelerated jet of fluid which blows between sealing surface 10 and seat 4 to clean them of dirt or other foreign matter before the flow is cut off entirely, as they engage and shut off port 3. The clearance between tip 11 and the periphery of port 3 is such that solid particles of a size likely to cause damage to seat 4 and/or to sealing surface 10 and/or to impair sealing engagement between the sealing surface 10 and seat 4, are unable to pass through restricted annular passage 13 from valve compartment 1b to the zone between seat 4 and sealing surface 10.

When sealing surface 10 engages seat 4 to shut valve A, tip 11 is located in port 3 and pressure in lower compartment 1b urges the peripheral formation 6b defined by the recessed outer end face 6a of the tip 11 radially outwardly into sealing engagement with the surround of port 3 to improve the sealing effect of the valve. Stem 14 which is fast with deformation member 8, is provided with a threaded socket 15 adapted to engage the threaded end 16a a non-rising operating spindle 16 which is rotatably located in central hole 17 through hollow plug 18. Retaining shoulder 19 which is integrally formed with spindle 16, is located inwardly of plug 18 and a hand wheel 10 is mounted on the outer end of spindle 16. By rotating spindle 16 in the one or the other direction by manipulation of hand wheel 20 on spindle 16, the latter can be screwed into or out of stem 14 on deformation member 8 so that the latter is raised from or lowered towards valve seat 4 to open or close the valve. Spindle 16 can rotate freely but is held against longitudinal movement relative to plug 18.

Threaded plug 18 is screwed into threaded socket 21 in casing 1 with the open end of cup-shaped housing 5 trapped between the thread of socket 21 and a tapered inner end 22 of plug 18. The open end of housing 5 normally tapers outwardly and is provided round its outer periphery with a screw thread 23 which is adapted to engage the thread of socket 21. Plug 18 is provided with a peripheral groove 27 at the lower end of its thread to avoid the tapered open end of housing 5 being caught in the threads of plug 18 and to ensure that the tapered inner end of plug 18 exerts adequate radial force on the open end of housing 5 to trap it firmly. The material of housing 5 which is forced into groove 27 assists to hold the open end of housing 5 from withdrawal from plug 18.

Housing 5 may be provided round its inner periphery in a position spaced inwardly of its open end, with a locating rib 24, which is adapted to seat against the tapered inner end 22 of plug 18, but this is not essential.

During use when deformation member 8 of closure means B is moved towards and away from seat 4, the wall of housing 5 extends and collapses longitudinally relative to spindle 16 to accommodate the movement of deformation member 8. The wall of housing 5 may become corrugated during movement of deformation member 8 away from seat 4. Housing 5 may be made of any suitable natural or synthetic resilient material, such as neoprene rubber, nitrile rubber which is resistant to diesolene, polyurethane, the material known as "TEFLON" or any other suitable polymer material.

The deformation member may also be made of any suitable natural or synthetic material, such as ferrous or non-ferrous metal or polymer material, such as synthetic hard rubber or "TEFLON".

Housing 5 encloses spindle 16 and isolates it from fluid flowing through valve A. Housing 5 provides an effective fluid seal round spindle 16 so that a packing or similar sealing means embracing spindle 16 is not required. The screw threaded engagement between the open end of resilient housing 5 and threaded socket 21 forms an effective seal against the escape of fluid under pressure from upper valve compartment 1a.

Where valve A is to be subjected to relatively high pressure a transverse flange 26 which constitutes a transverse backing formation, may be fast with stem 14 of deformation member 8 in a position spaced from deformation member 8. Stem 14 constitutes a longitudinal backing formation. The lower surface of flange 26 presents a transverse seat and the outer peripheral surface of stem 14 in the zone between flange 26 and deformation member 8 presents a longitudinal seat against which the wall of resilient housing 5 may bear when it is displaced radially inwardly into annular space 28 round stem 14 by pressure in valve compartment 1a. Such inward displacement of the wall of housing 5 into space 28 serves as a resilient shock absorbing means to minimise water hammer effects.

The radial projection of deformation member 8 beyond its stem 14 may be related to the radial projection of transverse flange 26 from stem 14 so that when the wall of resilient housing 5 is displaced inwardly by pressure in valve compartment 1a, upward pressure against transverse flange 26 is in balance or very nearly in balance with downward pressure on the projection of deformation member 8, thereby to create a condition of substantial pressure balance in compartment 1a which facilitates the upward movement of closure means B to open valve A.

Instead of a flange 26 which is integral with stem 14 as shown in FIG. 1, stem 14 may be provided with a separate collar which is secured to stem 14, such as by welding, to constitute a transverse backing formation. In FIG. 1, partition 2 is shown as integrally formed with casing 1. It is also possible for partition 2 to comprise a separate element adapted to be secured to casing 1 in the edge zones 2a, such as by welding. Casing 1 may have any suitable shape other than that shown in FIG. 1.

Instead of a non-rising operating spindle 16, a spindle which moves up and down during opening and closing of the valve may be provided.

Instead of spindle 16 being rotatably mounted in an externally threaded plug 18 engageable in an internally threaded socket 21 on casing 1, spindle 16 may be rotatably mounted in an internally threaded bonnet, cap or the like adapted to engage an axially threaded spigot formation on casing 1.

Referring now to FIG. 4, valve C comprises casing 30 in the form of a T-piece, partition 31 dividing the interior of casing 30 into upper and lower compartments 30a, 30b respectively and defining a port 32 which places the upper and lower compartments 30a, 30b in communication with each other. Partition 31 defines annular valve seat 33 around port 32. Closure means D is movable towards and away from seat 33 to shut off and open port 32.

Closure means D comprises cup-shaped resilient housing or diaphragm 34 including base 35 closing off one end of the housing. Cup-shaped rigid member 36 is located within resilient housing 34 with the base of housing 34 trapped between the base of rigid member 36 and resilient body 37. Rigid member 36, housing 34 and resilient body 37 are secured together by means of bolt 38. It will be seen that rigid member 36 is provided with a longitudinally extending peripheral flange 39 which urges the base 35 of housing 34 into an annular recess 40 in the upper face of resilient body 37 to effect a pressure tight seal between housing 34 and resilient body 37.

Resilient body 37 defines annular sealing surface 41; and an outer tip 42 which protrudes from sealing surface 41 towards port 32 and has a recessed outer end 43 defining a resilient peripheral rim 44. As can be seen from FIG. 4, protruding tip 42 is adapted to enter port 32 with a slight clearance prior to sealing surface 41 engaging seat 33 when closure means D is moved towards seat 33 to shut off port 32.

Closure means D of valve C operates in similar manner to closure means B of valve A of FIGS. 1 and 2. Tip 42 obstructs the central part of port 32 and defines a restricted annular passage 45 which extends round the periphery of port 32 and through which an accelerated jet of fluid can blow into the zone between sealing surface 41 and seat 33 before sealing surface 41 engages seat 33. When sealing surface 41 engages seat 33 to shut valve C, tip 42 is located in port 32 and pressure in lower valve compartment 30b urges the peripheral rim 44 defined by the recessed outer end 43 of tip 42 radially outwardly into sealing engagement with the periphery of port 32 to improve the sealing effect of the valve.

A flanged plug 47 is located in the open end of cup-shaped rigid member 36 and is secured thereto by grub screws 48. Plug 47 is provided with threaded socket 49 adapted to engage threaded end 50a of non-rising operating spindle 50 which is rotatably located in central hole 51 through cap 52. Thrust bearing 53 embraces spindle 50 inwardly of cap 52 and a retaining collar 54 is fast with spindle 50 inwardly of bearing 53. By rotating spindle 50 in the one or the other direction by manipulating handle 55 on the outer end of spindle 50, the latter may be screwed into or out of plug 47 on cup-shaped rigid member 36 so that the latter is raised from or lowered towards valve seat 33, thereby to raise or lower resilient body 37 from or towards valve seat 33. Spindle 50 can rotate freely but is held against longitudinal movement relative to cap 52.

Cap 52 is bolted to casing 30 in alignment with socket 56 in casing 30 and with the open end of cup-shaped resilient housing 34 trapped between the flanges 57, 58 on cap 52 and casing 30 respectively. During use when resilient body 37 of closure means D is moved towards and away from seat 33, the wall of resilient housing 34 extends and collapses longitudinally relative to spindle 50 to accommodate the movement of resilient body 37. The wall of housing 34 may become corrugated during movement of resilient body 37 away from seat 33. Housing 34 may be made of any suitable natural or synthetic resilient material, such as neoprene or nitrile rubber or any other suitable polymer material.

Resilient body 37 may also be made of any suitable natural or synthetic material, such as "TEFLON" or any other suitable polymer material. Resilient housing 34 encloses spindle 50 and isolates it from fluid flowing through valve C so that a packing, gland or similar sealing means embracing spindle 50 is not required.

Flange 60 on plug 47 constitutes a transverse backing formation for resilient housing 34 and rigid member 36 constitutes a longitudinal bracking formation for resilient housing 34. The lower surface of flange 60 presents a transverse seat and the outer peripheral surface of the wall of rigid member 36 presents a longitudinal seat against which the wall of resilient housing 34 may bear when it is displaced inwardly by pressure in valve compartment 30a.

Instead of valve casing 30 and other metal parts of the valve of FIG. 4 being of cast construction as illustrated, they may be fabricated as shown in FIG. 5. Basically, the valve of FIG. 5 is similar to the valve of FIG. 4 and in FIGS. 4 and 5 similar reference numerals are used to indicate similar parts.

In order to obtain a maximum utilization of material in the valve of FIG. 5, the circular disc that is cut out of partition 31 to produce port 32, may be reduced in diameter and used as the base 36a of cup-shaped rigid member 36. The circular disc cut out of securing flange 57 on cap 52 may be dished and used as the top 52a of cap 52. The circular disc cut out of securing flange 58 on casing 30 may be reduced in diameter and used as the thrust plate 47 which is bolted across the open end of rigid member 36 by means of studs 48 which are welded to the inner periphery of rigid member 36.

It will be seen that in FIG. 5 resilient body 37 is provided with an annular recess or groove 61 in the outer end 43 of its tip 42 in a position spaced radially inwardly from the outer periphery of tip 42 to define a resilient peripheral sealing lip or rim 44.

It will also be seen from FIG. 5 that the radial projections of resilient body 37 beyond resilient housing 34 are kept to a minimum and that the difference between the outer diameter of resilient body 37 and of flange 60 on thrust plate 47 is also small. The back pressures on the projection of resilient body 37 beyond resilient housing 34 and on the flange 60 are very nearly in balance so that on upward movement of the closure means D to open the valve the forces acting on the studs 48 holding thrust plate 47 and on the self-tapping screws 38 securing rigid body 36, resilient housing 34 and resilient body 37 together, are small.

Apart from the pressure tight seal between housing 34 and resilient body 37 at annular recess 40 and flange 39, there is also a pressure tight seal between housing 34 and casing 30 at 62 due to the pressure exerted on housing 34 by the annular protrusion 63 of cap 52 beyond flange 57.

Housing 34 is capable of yielding resiliently in the region of peripheral flange 39 at the upper face of resilient body 37 and also in the region 64 near the upper end of rigid body 36. This accommodates and minimizes water hammer effects when the valve is closed.

Additional resilient shock absorbing areas may be provided by providing apertures in the wall of rigid body 36 in strategic positions.

It will be appreciated that many other variations in detail are possible without departing from the scope of the appended claims. For example, the operating spindle for the closure means of a valve according to the invention may have a multi-start thread to provide greater valve closing force and a quick action. The cup-shaped resilient housing 5 of FIG. 1 or the cup-shaped rigid member 36 of FIGS. 4 and 5 may serve as a reservoir for lubricant for the spindle.

The invention is not restricted in application to screw down stop valves, but may also be applied to other types of valves with suitable operating means. Thus, the invention may be applied to resiliently biassed relief valves. The invention is also applicable to pneumatically, hydraulically, solenoid and float operable valves.

With a valve according to the invention, the mating faces of the sealing surface of the closure means and the valve seat round the port are cleansed of foreign matter by an accelerated jet of fluid before they close, thereby to minimize the danger of solid particles in suspension in a fluid passing through the valve being trapped between the mating faces and to reduce wear of the mating faces. Moreover, the sealing engagement of the protrusion on the closure means with the surround of the port which is caused by pressure in the valve when the sealing surface engages the seat, improves the sealing effect of the valve and increases wth increasing pressure. The closing forces required to be applied to the closure means for an effective seal may be reduced, thereby to reduce stress in the operating means and increase the working life of the sealing surface and other parts prone to wear. The removable resilient housing 5 of FIGS. 1 and 2 or the removable resilient body 37 of FIGS. 4 and 5 may be replaced without removing the valve casing from a fluid line in which it is connected, by removing cap 18 of FIG. 1 or cap 52 of FIGS. 4 and 5 from the casing.

A valve according to the invention may be mounted in any required position relative to the vertical or horizontal and may even be mounted upside-down.

I claim:

1. A valve, comprising: a fluid port; a valve seat round the port; and closure means movable towards and away from the seat, the closure means including a sealing surface engageable with the seat and a protrusion of resilient material which extends from the sealing surface towards the seat, the protrusion being from the sealing surface towards the seat, the protrusion being operative to create a flow of fluid of increased velocity between the seat and the sealing surface prior to the latter engaging the seat upon movement of the closure means towards the seat and the protrusion further being adapted for at least part thereof to be urged automatically into sealing engagement with the surround of the port by fluid pressure in the valve when the sealing surface engages the seat, the closure means further including a resilient diaphragm which is adapted to isolate operating means for the closure means from fluid flowing through the valve and which is adapted to be anchored in an outer peripheral zone thereof to a casing for the valve, the diaphragm being provided at its outer peripheral zone with a screw thread engageable with a screw thread on at least one of two parts between which the outer peripheral zone of the diaphragm is adapted to be trapped.

2. A valve, comprising: a fluid port; a valve seat round the port; and closure means movable towards and away from the seat, the closure means including a sealing surface engageable with the seat and a protrusion of resilient material which extends from the sealing surface towards the seat, the protrusion being operative to create a flow of fluid of increased velocity between the seat and the sealing surface prior to the latter engaging the seat upon movement of the closure means towards the seat and the protrusion further being adapted for at least part thereof to be urged automatically into sealing engagement with the surround of the port by fluid pressure in the valve when the sealing surface engages the seat, the closure means further including a resilient diaphragm which is integrally formed with the part of the closure means defining the sealing surface and protrusion and which is adapted to isolate operating means for the closure means from fluid flowing through the valve, the closure means and diaphragm comprising a deformable cup-shaped housing of resilient material which comprises a generally tubular wall and a base with a substantially plane outer end face when the housing is in a normal undeformed condition; and an oversized deformation member having a larger outer diameter than the diameter of the inner periphery of the housing in the zone of the base thereof when the housing is in a normal undeformed condition, the deformation member being locatable in the housing adjacent to the base thereof to deform the wall and base of the housing to form an outward bulge in the housing which defines the sealing surface and also to form a resilient protrusion of smaller diameter than the bulge which extends from the sealing surface on the bulge, the protrusion having a recessed outer end face defining a peripheral formation adapted to be urged automatically into sealing engagement with the surround of the port by fluid pressure in the valve when the sealing surface engages the seat.

3. A valve, comprising: a fluid port; a valve seat round the port; and closure means movable towards and away from the seat, the closure means comprising a deformable cup-shaped housing of resilient material which in a normal undeformed condition comprises a generally tubular wall and a base having a substantially plane outer end face extending transversely across an end of the tubular wall; and an oversized deformation member having a larger outer diameter than the diameter of the inner periphery of the housing in the zone of the base thereof when the housing is in a normal undeformed condition, the deformation member being locatable in the housing adjacent to the base thereof to deform the wall and base to form a bulge in the housing which defines an annular resilient sealing surface on the outside of the housing which is engageable with the valve seat and also to form a resilient protrusion of smaller diameter than the bulge which extends from the sealing surface towards the valve seat and which is adapted to enter the port, the protrusion further being adapted for at least part thereof to be urged automatically into sealing engagement with the surround of the port by fluid pressure in the valve when the sealing surface engages the seat.

4. A valve as claimed in claim 3, wherein the protrusion has a recessed outer end face defining a resilient peripheral formation adapted to be urged automatically into sealing engagement with the surround of the port by fluid pressure in the valve when the sealing surface engages the seat.

5. A valve as claimed in claim 3 or 4, wherein the housing includes a retaining formation adapted to trap the deformation member in the housing adjacent to the base thereof.

6. A valve as claimed in claim 5, wherein the housing is adapted to be trapped towards its open end between a portion of a casing of the valve and a part which is removably mountable on the casing, the portion of the housing between the bulge and the trapped zone of the housing constituting a resilient diaphragm adapted to isolate operating means for the closure means from fluid flowing through the valve and the housing including towards its open end a screw thread adapted to engage with a screw thread on at least one of the parts between which the housing is trapped.

7. A valve as claimed in claim 6, wherein the deformation member is mushroom-shaped and includes an enlarged head adapted to deform the housing and a stem of reduced diameter extending from the head towards the open end of the housing, the stem constituting a rigid longitudinally disposed backing member against which the diaphragm may bear when subjected to pressure in the valve and the stem further being engageable with operating means for moving the deformation member towards and away from the valve seat to move the sealing surface and protrusion of the closure means towards and away from the valve seat.

8. A valve as claimed in claim 7, including a rigid transverse backing formation for the diaphragm which is fast with the stem in a position spaced from the head.

9. A valve as claimed in claim 3 or claim 4, wherein the housing is adapted to be trapped towards its open end between a portion of a casing of the valve and a part which is removably mountable on the casing, the portion of the housing between the bulge and the trapped zone of the housing constituting a resilient diaphragm adapted to isolate operating means for the closure means from fluid flowing through the valve and the housing including towards its open end a screw thread adapted to engage with a screw thread on at least one of the parts between which the housing is trapped.

10. A valve as defined in claim 2, wherein the outer periphery of the wall of the housing defines a relatively sharp corner with the plane outer end face of the housing when the latter is in a normal undeformed condition.

11. A valve as claimed in claim 2, wherein the housing is adapted to trap the deformation member in the housing adjacent to the base thereof.

12. A valve as claimed in claim 11, wherein the housing includes an inwardly directed rib or other retaining formation extending round the inner periphery of the housing in a position spaced from the base.

13. A valve as claimed in claim 2, wherein the deformation member is adapted to be moved towards and away from the seat, thereby to move the sealing surface and the tip of the closure means towards and away from the seat.

14. A valve as claimed in claim 13, wherein the deformation member is adapted to be connected to operating means for the closure means.

15. A valve as claimed in claim 2, or claim 11 or claim 13, wherein the open end of the housing is adapted to be trapped between a portion of the casing and a part which is removably mountable in or on the casing.

16. A valve as claimed in claim 15, wherein the open end of the housing includes at its outer end a screw thread adapted to engage with a screw thread on at least one of the parts between which it is trapped.

17. A valve as claimed in claim 2, including backing means against which the diaphragm may bear when subjected to pressure in the valve.

18. A valve as claimed in claim 2 or claim 11 or claim 13, wherein the deformation member is mushroom-shaped with an enlarged head adapted to distend the housing and a stem of reduced diameter extending from the head towards the open end of the housing, the stem constituting a rigid longitudinally disposed backing member for the diaphragm constituted by the housing and a rigid transverse backing formation being fast with the stem in a position spaced from the head.

19. A valve as claimed in claim 18, wherein the transverse backing formation comprises a collar or flange on the stem.

20. A valve as claimed in claim 18, wherein the stem of the deformation member includes a screw threaded socket adapted to engage a screw threaded end of an operating spindle for the closure means.

21. Valve closure means comprising a deformable cup-shaped housing of resilient material which in a normal undeformed condition comprises a generally tubular wall and a base having a substantially plane outer end face extending transversely across an end of the tubular wall; and an oversized deformation member having a larger outer diameter than the diameter of the inner periphery of the housing in the zone of the base thereof when the housing is in a normal undeformed condition, the deformation member being locatable in the housing adjacent to the base thereof to deform the wall and base of the housing to form an outward bulge in the housing which defines an annular resilient sealing surface on the outside of the housing and also to form a resilient protrusion of smaller diameter than the bulge which extends away from the sealing surface and is deformable by fluid pressure.

22. Valve closure means as claimed in claim 21, wherein the housing is adapted to trap the deformation member in the housing adjacent to the base thereof.

23. In or for valve closure means, a deformable cup-shaped housing of resilient material which in a normal undeformed condition comprises a generally tubular wall and a base having a substantially plane outer end face extending transversely across an end of the tubular wall, the housing being adapted to receive in a position adjacent to its base an oversized deformation member having a larger outer diameter than the diameter of the inner periphery of the housing in the zone of the base thereof when the housing is in a normal undeformed condition, the wall and base of the housing being deformable by the deformation member to form an outward bulge in the housing which defines an annular resilient sealing surface on the outside of the housing and also to form a resilient protrusion of smaller diameter than the bulge which extends from the sealing surface, the open end of the housing including a screw thread engageable with a screw thread on at least one of two parts between which the open end is adapted to be trapped.

24. A housing as claimed in claim 23, including an inwardly directed retaining formation on the inner periphery of the housing in a position spaced from the base and operative to trap the deformation member in the housing adjacent to the base thereof.

* * * * *